Nov. 14, 1933.　　　　　E. BRETCH　　　　　1,934,909
ALTERNATING CURRENT MOTOR
Filed April 15, 1929　　2 Sheets-Sheet 2
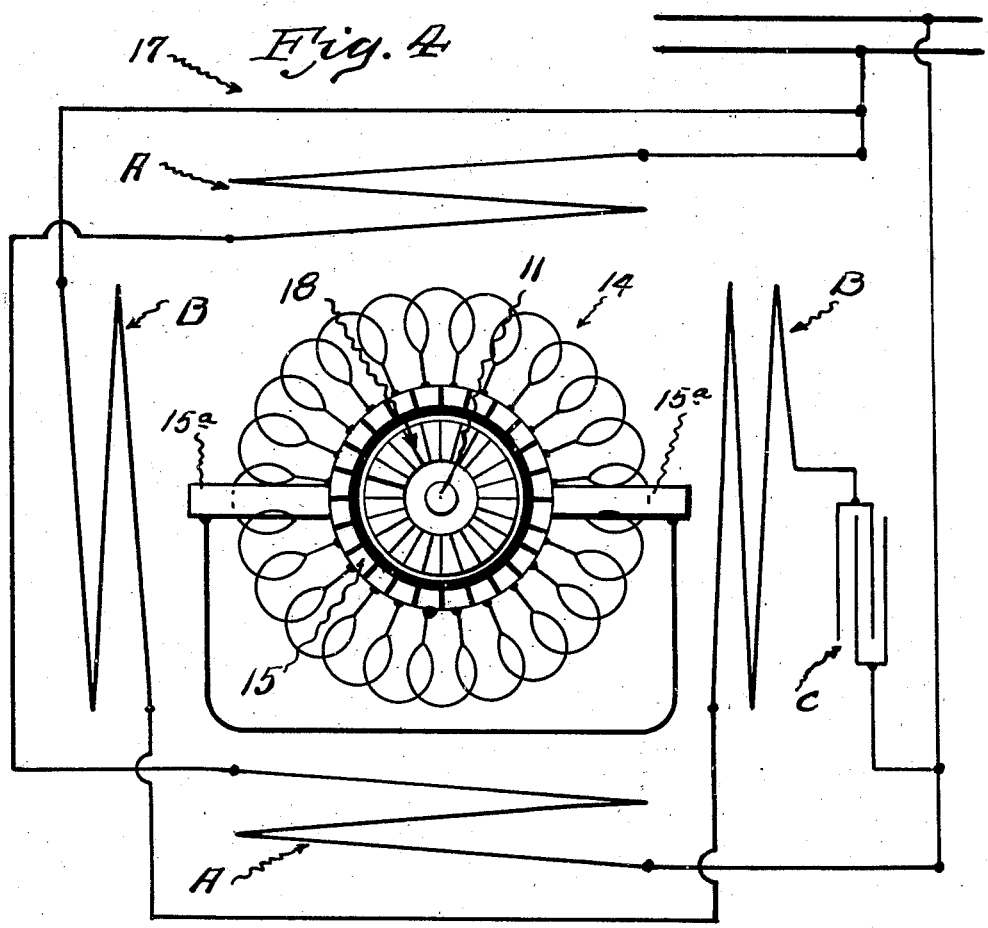
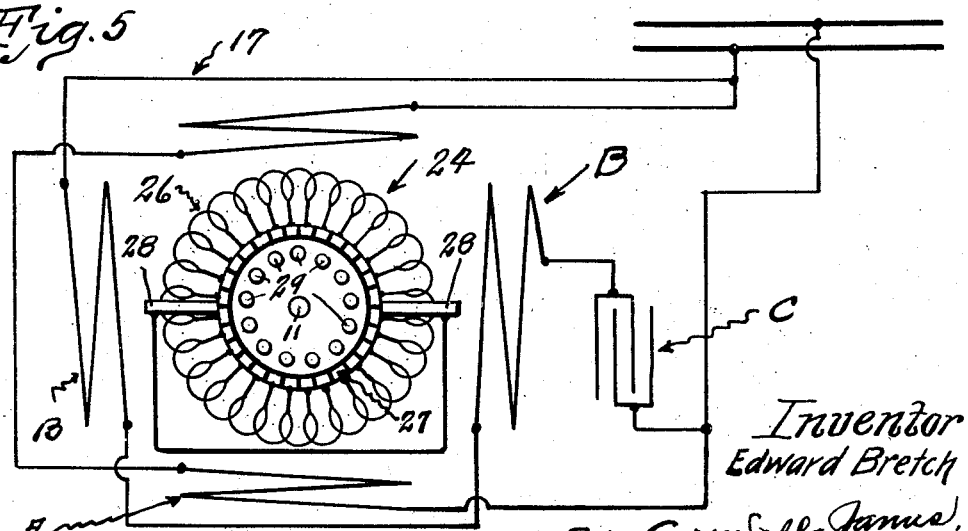
Inventor
Edward Bretch
By Cornwall & James
Attys.

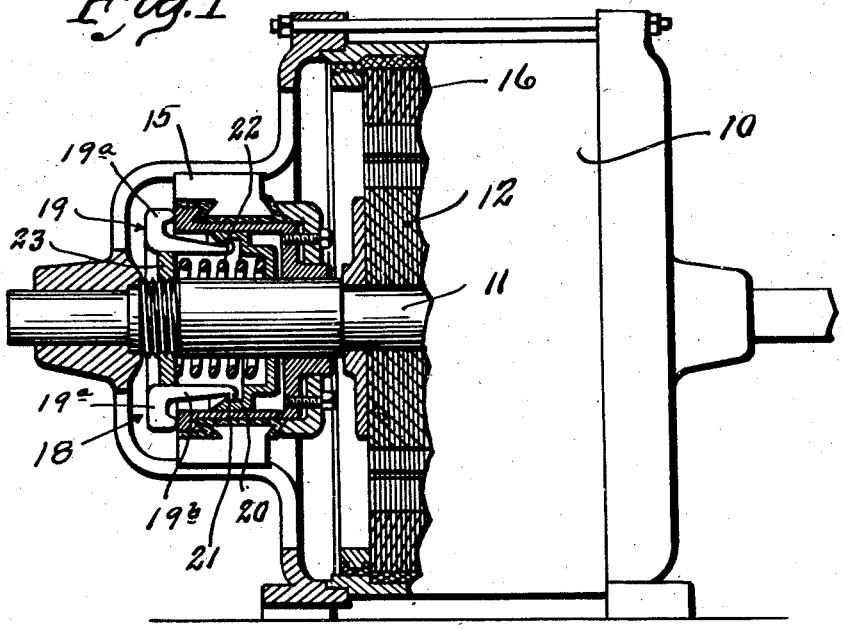
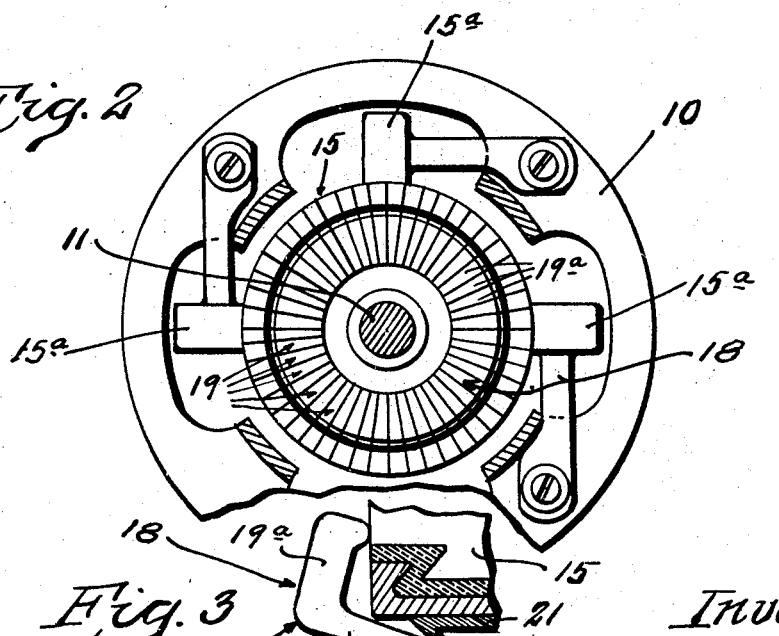

Patented Nov. 14, 1933

1,934,909

UNITED STATES PATENT OFFICE 1,934,909

ALTERNATING CURRENT MOTOR

Edward Bretch, St. Louis, Mo.

Application April 15, 1929. Serial No. 355,249

8 Claims. (Cl. 172—277)

This invention relates to new and useful improvements in alternating current motors.

It is well known in the art that a squirrel cage alternating current motor is more efficient and the output thereof is greater when operated from a poly-phase supply than when operated from a single-phase supply. This is due to the fact that where the motor is operated poly-phase, the revolving field is produced by electric current taken directly from the electric supply circuit, and where the motor is operated single-phase the revolving field is produced by the rotation of the rotor and the reactions of the rotor currents instead of currents taken directly from the supply circuit.

This transformation of the oscillating field produced by single-phase current into a revolving field through the rotor reaction is accomplished by a considerable loss of energy in the rotor. Thus in loading the rotor the revolving field, due to slip, tends to become elliptical rather than circular, thereby reducing the torque, which is necessary to pull the rotor out of step. Consequently instead of coordinating the speeds of the rotor with the speed of the revolving field, the slip is increased, thereby increasing the consumption of the current and reducing the efficiency of the motor. Therefore, the output is considerably less where the motor is operated single-phase than when operated poly-phase.

Also in starting from a standstill, the single-phase squirrel cage motor has no starting torque (unless a phase splitting device is used and this makes the motor an unbalanced poly-phase machine). But this difficulty has been overcome by the use of the repulsion induction motor where the initial starting torque is provided by brushes and a commutator and wherein, when the rotor reaches the operating speed, the motor operates as a squirrel cage motor.

While the repulsion induction motor provides starting characteristics that compare favorably with any other type at operating speed, it still requires of the rotor a double function of carrying the mechanical load and at the same time transferring the oscillating field into a revolving one. This is unsatisfactory as considerable loss of energy occurs during the transformation of the oscillating field into the revolving field, and consequently the operation of the motor is not efficient.

In order to relieve the rotor of this extra function of transforming the single-phase oscillating field into a revolving field and in order to lessen materially the rotor losses and maintain the revolving field more closely under load conditions when the speed of the rotor is reduced, I provide a motor having the revolving or primary field arranged with a divided winding and interposing a condenser in a branch of the winding so as to produce a poly-phase effect independent of the rotor reactions.

As the losses in the condenser are negligible and those of the rotor which they thus eliminate quite large, it will be readily apparent that the efficiency of the motor is considerably increased by the use of my improved construction.

Furthermore, since the condenser will have a tendency to maintain the revolving field independent of the rotor reactions, the output of the motor will be larger since this revolving field will remain more nearly circular.

Also inasmuch as the condenser takes a leading current the leading component can be so proportioned as practically to neutralize the normal lagging current taken by all induction motors and thus cause the motor to operate at practically unity power factor.

Other objects of my invention are to provide an alternating current motor having the favorable starting characteristics of a repulsion induction motor and having its revolving field so arranged as to reduce the rotor reactions to minimum so as to eliminate losses of energy in the rotor and insure effective operation of the motor under varying load speeds.

Further objects of the invention are to provide an improved alternating current motor having its rotor provided with commutated windings furnishing the necessary starting torque and providing the revolving field with divided windings and interposing a reactance condenser in one or more of said windings so as to produce a poly-phase effect independently of the rotor reactions.

Still further objects of the invention are to provide an alternating current motor having a rotor provided with commutated windings and a suitable short-circuiting device whereby the initial starting torque of the motor is furnished by said commutated winding and having the revolving field provided with a condenser whereby said revolving field is maintained by the action of the condenser rather than by rotor reactions.

With these and other objects in view, my invention consists in certain novel features of construction hereinafter more fully described and claimed, and illustrated in the accompanying drawings, in which—

Figure 1 is a side elevational view, partly in cross section, of my improved motor.

Figure 2 is a vertical cross section of the motor showing the short-circuiting device in elevation.

Figure 3 is an enlarged detail view showing the short-circuiting device in moved position in contact engagement with the armature winding.

Figure 4 is a diagrammatic view of the windings of my improved motor.

Figure 5 is a modified form of my invention.

Referring by numerals to the accompanying drawings, 10 indicates a motor casing in which is mounted a revoluble shaft 11 carrying an armature core 12. This core is provided with an armature or secondary winding 14 and a commutator 15 to which the armature windings are connected. A field core 16 having field or primary windings 17 is arranged in casing 10 and encircles armature 12 and armature windings 14.

Cooperating with the commutator 15 are brushes 15a which are pivotally mounted on the casing 10 and spring-held in engagement with said commutator.

A short-circuiting device 18 is used to short circuit said commutator windings 14 when the motor attains the predetermined speed. This device may be of the type disclosed in my United States Letters Patent No. 1,111,358. In this type of device there are a plurality of short-circuiting plates 19 having transverse ends 19a movable into and out of contact engagement with the segments of commutator 15 and having longitudinal ends 19b terminating in hooks 20 which are in engagement with a ring 21. This ring is pressed inwardly by a coiled spring 22 which is arranged coaxially with the shaft 11. One end of this spring presses against a nut or adjusting ring 23 which is adjustably screw-seated on said shaft. The tendency of this spring is to hold the plates 19 in retracted positions out of contact with the commutator 15. Under this condition, the various armature windings 14 are independent of each other and cooperate with brushes 18 so that the motor operates as a repulsion induction motor. This type of motor has a large starting torque and comes up to speed rapidly.

When the armature 12 attains a predetermined speed the centrifugal action causes the plates 19 to move out radially, thereby drawing the ring 21 forwardly against the tension of spring 22, compressing the latter. When in this outward moved position the transverse ends 19a are in contact with the segments of the commutator 15 so that the armature windings 14 are short-circuited and said motor operates as a single-phase induction motor. This construction of the motor is well-known and other forms of short-circuiting devices can be used for this purpose.

In order to eliminate objectionable features of the single-phase motor and relieve the rotor or armature windings of the function of transforming the single phase field into a revolving field, thereby materially reducing the rotor losses, and in order to maintain more nearly the revolving field under load conditions when the speed of the rotor is reduced, I interpose a condenser into a branch of the field or primary winding, thereby producing a poly-phase effect independent of the rotor reactions. This field or primary winding 17 consists of two branch windings A and B so arranged that they are mechanically out of phase. One branch winding A is connected directly across the line and the other branch winding B is connected across the line but has a reactance or condenser C interposed therein in series therewith.

The windings and the condenser or reactance are arranged as nearly as possible so that the electric currents in said branch windings A and B are out of phase substantially the same degree as the mechanical phase displacement of the coils of said branches, and also so that the currents in the branches will be of such magnitudes as to provide an approximately true revolving field. The closer these conditions can be approached the more of the rotor losses will be eliminated and the higher the efficiency of the rotor will be in operation as a squirrel cage rotor.

While the operating characteristics of a squirrel cage single-phase motor (either split phase or condenser) are satisfactory, their starting characteristics are not suitable for heavy load starting; my improved motor utilizes the commutated windings of the secondary or rotor to improve the starting torque of the condenser motor in the same manner as the commutated windings are used to improve the starting characteristics of the split phase motor.

Thus my improved motor provides the same improved starting chcaracteristics over the ordinary condenser motor as the repulsion induction motor does over the ordinary split phase motor.

In the modified form shown in Figure 5, my invention is shown appplied to an alternating motor of the type disclosed in my United States Patent No. 848,719.

In this type of motor the armature 24 is provided with two windings, which are separate and distinct from each other. The armature 24 consists preferably of a slotted laminated core. The slotted portion receives an outer commutated winding 26 which is connected to a commutator 27, having brushes 28.

An inner squirrel cage winding 29 consists of a plurality of bars which are embedded in said core 25 and are spaced suitable distance from the outer winding 26. At a standstill or low speed the magnetic flux is forced outside the winding 29 toward the winding 26 so that the squirrel cage winding 29 will be inoperative. When the motor attains normal speed the magnetic flux will pass or be short-circuited through winding 29, rendering winding 26 inoperative. The field or primary of this motor is the same as in the preferred form.

In either case the commutated winding is used in starting and when running at low or subnormal speeds. At normal speed the commutated winding is short-circuited and the motor operates as a squirrel cage motor. This short circuiting is accomplished either mechanically by a suitable short circuiting mechanism, or electrically by a particular construction of the armature.

The field or primary has its winding divided into a plurality of branches and certain of said branches have connected in series therewith a reactance or condenser while the other branches are connected directly across the line. The branches are so arranged as to be mechanically as well as electrically out of phase so that a substantially true revolving field is produced.

Since in my improved motor it is not the function of the condenser to furnish starting torque, the condenser is proportioned for load and operating conditions. No switching of resistance, condensers, transformer, and the like is necessary as my motor comes up from starting to running condition. Thus a most favorable condition of starting characteristic combined with a most favorable operating characteristic is provided. Furthermore, should the condenser circuit for any reason become displaced, the motor would start and carry a large proportion of the original capacity and could be used in an emergency without the condenser. Thus in case of condenser failure my improved motor would not be entirely out of service as in the case of the squirrel cage condenser motor.

While I have shown the preferred form of my invention, it is obvious that various changes in the construction and arrangement of parts of my improved alternating current motor can be made and substituted for those herein shown and described without departing from the spirit of my invention.

I claim:

1. A single speed alternating current motor comprising in combination main lines, a main primary winding connected thereto, an auxiliary primary winding displaced in space relation from said main primary winding and electrically connected to said main lines, a condenser arranged in series in said auxiliary winding, and a rotor having commutated winding, said primary winding and said condenser producing a substantial single phase field while said rotor is at standstill or running at low speed and producing a polyphase field effect at normal speed, said rotor being so arranged as to utilize this single phase field effect during starting operation and to utilize said polyphase field effect under normal running speed.

2. A single speed alternating current motor comprising in combination a main primary winding, an auxiliary primary winding displaced in space relation from said main primary winding and electrically connected therewith, a condenser connected in series in said auxiliary primary winding to advance the phase of the current in said auxiliary winding, both of said windings and said condenser being so proportioned as to provide a substantial single phase field component at standstill or low speed, and a repulsion starting rotor cooperating with said primary windings and adapted to utilize said single phase field component to provide the initial start and adapted to operate substantially as a squirrel-cage motor at normal running speeds.

3. A single speed alternating current motor comprising in combination a main primary winding, an auxiliary primary winding displaced in space relation from said main primary winding and electrically connected thereto, phase advancing means electrically associated with said auxiliary primary winding, and a secondary member having current controlling means to control and direct the secondary current at or near standstill so as to set up secondary poles at an oblique angle from the primary poles.

4. A single speed alternating current motor comprising in combination a main primary winding, an auxiliary primary winding displaced in space relation from said main primary winding and electrically connected thereto, a condenser connected in series in said auxiliary primary winding, and a secondary member including commutated windings, brushes and commutator to set up at or near stand-still poles in said secondary member at an oblique angle from the poles of said primary windings to utilize the single phase field component for starting, said secondary member including a squirrel cage for operating as a squirrel cage rotor at normal running speed.

5. A single speed alternating current motor comprising in combination a stationary member having a main winding, and an auxiliary winding displaced in space relation from said main winding and electrically connected thereto; phase advancing means associated with said auxiliary winding, and a rotating member having current controlling means to control and direct the currents in the rotating member to set up at or near standstill in said rotating member poles at oblique angles from the poles of said stationary member to provide the initial start and to utilize the squirrel cage effect when running at full speed.

6. A single speed alternating current motor comprising in combination a polyphase field member unbalanced both as to phase and voltage for producing a substantial single phase field component at or near standstill, and a rotor including means for utilizing said single phase field component to provide the initial start and for operating substantially as squirrel cage motor at normal running speed.

7. A single speed alternating motor comprising in combination a rotor having a commutated winding, short-circuiting brushes cooperating with said winding for starting said motor, a short-circuiting device for short-circuiting said commutated windings when the motor attains full speed, a field member having a winding divided into a plurality of branches mechanically out of phase, and a reactance interposed in certain of said branches, said branches and said reactances being so arranged that the currents in said branches are approximately of the same phase angle as the mechanical phase angle of said branches at running speed.

8. A single speed alternating current motor comprising in combination an unsymmetrical polyphase field member energized by a main constant voltage and by a variable auxiliary voltage derived from said main constant voltage, said auxiliary voltage being variable in both phase and magnitude so as to produce a substantial single phase field component at or near standstill, and a commutated rotor adapted to utilize said single phase field component to provide the initial start and adapted to operate substantially as a squirrel cage at normal running speed.

EDWARD BRETCH.